H. J. DONAHOE.
METALLIC VEHICLE WHEEL.
APPLICATION FILED OCT. 9, 1911.
1,018,303.
Patented Feb. 20, 1912.
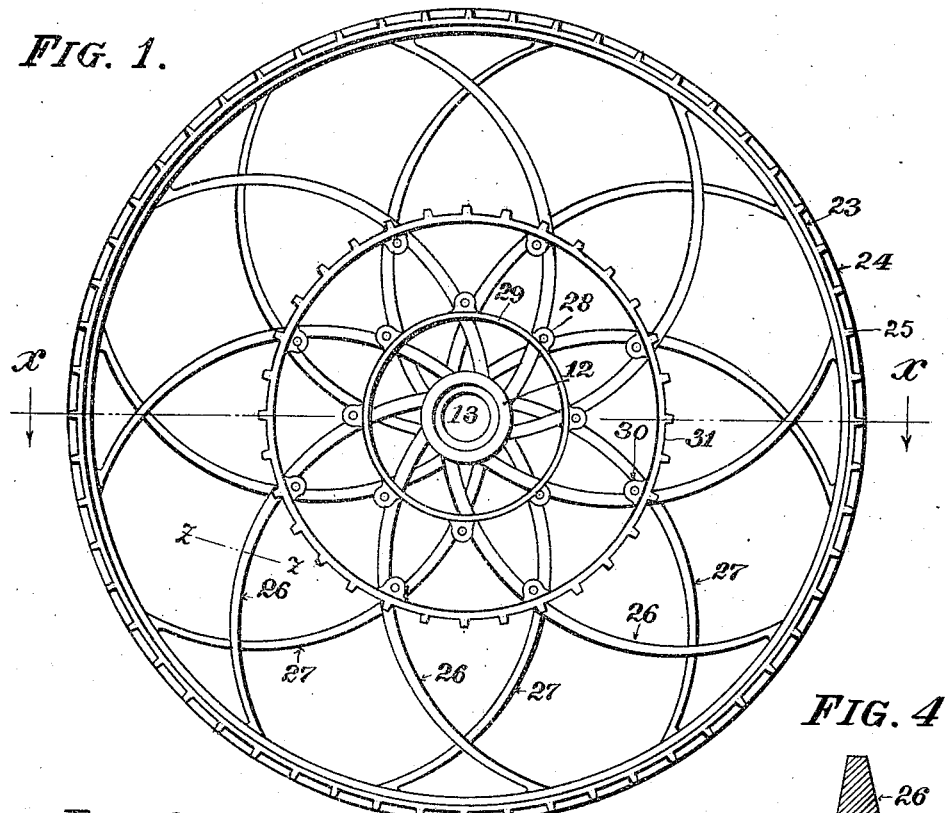
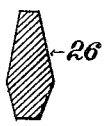
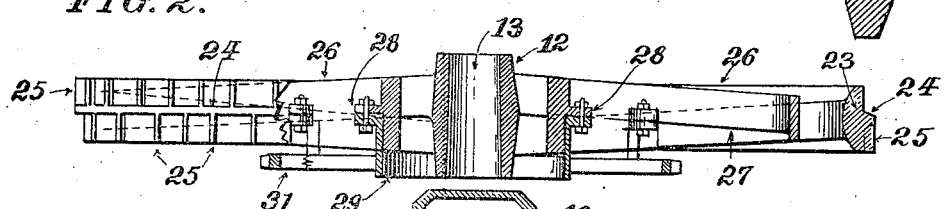
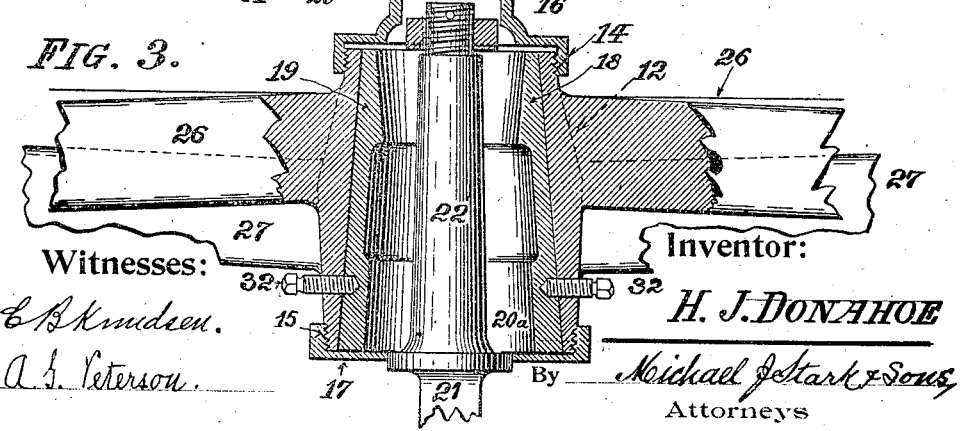
Witnesses:
C. B. Knudsen.
A. S. Peterson.
Inventor:
H. J. DONAHOE
By Michael J. Stark & Sons,
Attorneys

UNITED STATES PATENT OFFICE.

HEDLEY JOHN DONAHOE, OF CHICAGO, ILLINOIS, ASSIGNOR OF ONE-HALF TO THEODORE C. TIEDEBOHL, OF CHICAGO, ILLINOIS.

METALLIC VEHICLE-WHEEL.

1,018,303.      Specification of Letters Patent.      Patented Feb. 20, 1912.

Application filed October 9, 1911. Serial No. 653,595.

*To all whom it may concern:*

Be it known that I, HEDLEY JOHN DONAHOE, a citizen of the United States, and resident of Chicago, in the county of Cook and State of Illinois, have invented certain new and useful Improvements in Metallic Vehicle-Wheels; and I do hereby declare that the following description of my said invention, taken in connection with the accompanying sheets of drawings, forms a full, clear, and exact specification, which will enable others skilled in the art to which said invention appertains to make and use the same.

This invention has general reference to metallic vehicle wheels; and it consists, essentially, in the novel and peculiar combination of parts and details of construction, as hereinafter first fully set forth and described, and then pointed out in the claim.

The object of this invention is the production of a strong, durable, serviceable, comparatively cheap, and effective vehicle wheel formed entirely of metal in the process of casting, said vehicle wheel being adapted for use in all kinds of vehicles, such as carriages, wagons, automobiles, gun-carriages, etc., and constructed for operation with or without resilient tires.

To accomplish these desirable results, I construct a metallic wheel as shown in the preferred embodiment of my said invention, in the accompanying drawings already referred to, in which—

Figure 1 is a front elevation of the said vehicle wheel. Fig. 2 is a sectional view of the same on line $x$—$x$ of Fig. 1, part of the figure being shown in elevation. Fig. 3 is a similar view of the central portion of the same, the figure being drawn on an increased scale. Fig. 4 is a sectional view of one of the spokes, on line $z$—$z$ of Fig. 1.

Like parts are designated by the same symbols of reference in all the figures.

This wheel, in its preferred form, is produced entirely in a single piece of casting, preferably of a uniform low-carbon steel. It comprises a central hub 12, which has a tapering bore 13, and which is externally screw-threaded at both ends at 14, 15, the former screw-thread being adapted to receive the usual oil cap 16, and the latter screw-thread being designed to receive the closing cap 17. In the bore of the hub 12 there is located a tapering sleeve 18, preferably made from a high-carbon steel suitably hardened and ground, there being in the bore of this sleeve two oppositely-tapering raceways 19, 20ª, constructed to receive roller bearings of approved construction.

21 designates the axle, and 22, the spindle thereof, which latter part is located in the bore of the sleeve 18, as illustrated in Fig. 3.

23 designates the fixed rim or tread of the wheel. It is of approximately semicircular transverse section; and it has upon its outer periphery a central, outwardly-projecting rib 24; and leading from this rib and transversely to the periphery of said rim, a series of equally-spaced mudlugs 25, the mudlugs on one side of said central annular rib 24 being staggered with reference to those on the opposite side thereof. This rim 23 is connected to the hub 12 by two series of curved spokes 26, 27, as clearly shown in Figs. 1 and 5, the series of spokes 26 starting from one side of the median line of the hub, and the series 27 starting from the other side thereof, both series of spokes being convergingly arranged so as to gradually merge one into the other and finally terminate in the inner surface of the rim in the same plane. These spokes are curved in opposite directions, the series 26 all curving in the same direction and the series 27 all curving in the opposite direction. These spokes, being angular in relation to the plane of the wheel, it follows that while the two series of spokes are just in contact with each other at the hub, or slightly overlapping each other, as indicated in Fig. 2, they gradually merge one into the other at their intersecting points thus forming an integral bond to the spokes at each intersecting point, so that a vehicle wheel constructed in the manner described is extremely strong yet comparatively light, while at the same time the wheel can be produced at a very reasonable cost.

At the angles formed by the intersecting spokes where they cross each other nearest to the hub, there are formed punctured lugs 28, to which may be secured the brake-rim 29, Figs. 1 and 2, and at the second intersection of said spokes there are formed similar lugs 30, adapted to receive the usual driving sprocket wheel 31.

In cases where the wheel is fastened to the axle and the driving power applied to the axle, I dispense with the roller bearing in the hub and substitute for the sleeve 18 a sleeve having a bore sufficiently small to fit the spindle 22 by a close fit, the wheel being secured to the spindle in any approved and efficient manner. To retain this sleeve in the hub, I provide a number of fastening screws 32, Fig. 3, or other suitable means to accomplish the desired result.

It will now be observed that a wheel having its hub, spokes and rim all formed in the process of casting, thus forming an integral body, the spokes being in two superposed sets gradually merging at their intersecting points one into the other, the spokes being curved and the curvature being in opposing directions as heretofore stated, possess the quality of being extremely strong, light yet flexible, is not liable to rupture caused by jars and jolts over rough roads and pavements, nor by the ever-varying expansion and contraction due to the influence of heat, thereby specially fitting this wheel for extensive travel in any country, over every class of roads, and at all seasons of the year with the positive assurance that accidents and delays will not be caused by a failure of the wheels.

It will be further observed that this all-metal wheel is also well adapted to receive the extremely wide treads that are a necessity where the vehicle is used upon sandy, loose, or wet soil, a fact that will be readily understood by persons skilled in the art to which this invention appertains.

In the construction of this wheel, the necessary strength of the spokes is secured by their being made rather wide as compared with their thickness, as illustrated in Fig. 4, thereby securing graceful outlines with ample strength.

Having thus fully described this invention, I claim as new and desire to secure to me by Letters Patent of the United States—

A vehicle wheel formed entirely of one piece of cast metal, comprising, a fixed rim or tread, a double series of spokes, and a central hub, one series of said spokes being curved in one direction and the other series of spokes being curved in the opposite direction, said spokes intersecting one another at a multiplicity of points, said spokes slightly overlapping each other at the hub and then gradually merging into each other and finally all terminating at the rim in the same plane, whereby said spokes are integrally connected to each other at each intersecting point, there being at the angles of the intersecting spokes punctured lugs constructed to receive removable attachments, as described.

In testimony that I claim the foregoing as my invention, I have hereunto set my hand in the presence of two subscribing witnesses.

HEDLEY JOHN DONAHOE.

Witnesses:
 MICHAEL J. STARK,
 FRIEDA T. LEBERSTEIN.